United States Patent
Aher et al.

(10) Patent No.: US 12,002,466 B2
(45) Date of Patent: *Jun. 4, 2024

(54) SYSTEMS AND METHODS FOR AVOIDING INADVERTENTLY TRIGGERING A VOICE ASSISTANT (71) Applicant: Rovi Guides, Inc., San Jose, CA (US)

(72) Inventors: Ankur Anil Aher, Maharashtra (IN); Jeffry Copps Robert Jose, Tamil Nadu (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/984,394

(22) Filed: Nov. 10, 2022

(65) Prior Publication Data
US 2023/0252986 A1    Aug. 10, 2023

Related U.S. Application Data (63) Continuation of application No. 16/861,643, filed on Apr. 29, 2020, now Pat. No. 11,527,245.

(51) Int. Cl.
G10L 25/60 (2013.01)
G10L 15/22 (2006.01)
G10L 25/18 (2013.01)

(52) U.S. Cl.
CPC ............. G10L 15/22 (2013.01); G10L 25/18 (2013.01); G10L 25/60 (2013.01); G10L 2015/223 (2013.01)

(58) Field of Classification Search
CPC ......... G10L 15/22; G10L 25/18; G10L 25/60; G10L 2015/223
See application file for complete search history.

(56) References Cited

U.S. PATENT DOCUMENTS

| 9,445,209 B2 | 9/2016 | Dadu et al. | |
|---|---|---|---|
| 9,548,053 B1 * | 1/2017 | Basye | G10L 15/22 |
| 10,366,699 B1 | 7/2019 | Dharia et al. | |
| 11,051,117 B2 * | 6/2021 | Lesso | H04R 29/001 |
| 11,361,756 B2 * | 6/2022 | Smith | G10L 15/22 |
| 11,527,245 B2 * | 12/2022 | Aher | G10L 15/22 |
| 2018/0130469 A1 * | 5/2018 | Gruenstein | G10L 25/51 |
| 2018/0254046 A1 * | 9/2018 | Khoury | G10L 25/51 |
| 2021/0158797 A1 | 5/2021 | Lesso et al. | |
| 2021/0343279 A1 | 11/2021 | Aher et al. | |

* cited by examiner

Primary Examiner — Abul K Azad
(74) Attorney, Agent, or Firm — Haley Guiliano LLP (57) ABSTRACT Systems and methods are provided herein for avoiding inadvertently triggering a voice assistant with audio played through a speaker. An audio signal is captured by sampling a microphone of the voice assistant at a sampling frequency that is higher than an expected finite sampling frequency of previously recorded audio played through the speaker to generate a voice data sample. A quality metric of the generated voice data sample is calculated by determining whether the generated voice data sample comprises artifacts resulting from previous compression or approximation by the expected finite sampling frequency. Based on the calculated quality metric, it is determined whether the captured audio signal is previously recorded audio played through the speaker. Responsive to the determination that the captured audio signal is previously recorded audio played through the speaker, the voice assistant refrains from being activated.

15 Claims, 8 Drawing Sheets

SYSTEMS AND METHODS FOR AVOIDING INADVERTENTLY TRIGGERING A VOICE ASSISTANT

CROSS REFERENCE TO RELATED APPLICATION

This application is a continuation of U.S. patent application Ser. No. 16/861,643, filed Apr. 29, 2020, which is hereby incorporated by reference herein in its entirety.

BACKGROUND

The present disclosure is directed to systems and methods for distinguishing between audio generated directly by human voice and previously recorded audio played through a speaker. In particular, systems and methods are provided for avoiding inadvertently triggering a voice assistant with previously recorded audio played through a speaker by using high-frequency sampling.

SUMMARY

Voice recognition systems often need to differentiate between real voice input and noise or extraneous signals. This problem is particularly difficult when the extraneous signal is previously recorded voice (e.g., voice being played through a speaker). Because voice being played through a speaker is similar to human voice, voice recognition systems may often confuse such noise with a real signal, leading to undesirable results. For example, an unnecessary command may be performed, or access may be improperly granted to a secure system.

This problem is particularly relevant to voice assistant systems. Voice assistants (e.g., voice-activated devices) rely on "always on" listening to trigger functions associated with the voice assistant. In some implementations, to perform a function associated with the voice assistant, a user must speak a specific trigger word or phrase (e.g., a keyword) that is used to prepare the voice assistant for performance of a function associated with a voice command following the keyword. For example, a voice assistant may be triggered by stating the name of the voice assistant (e.g., "Alexa") or by stating a phrase (e.g., "Ok smartphone"). However, the keyword may also be a word that is output by a speaker (e.g., of a TV, radio, smartphone, etc.) in the vicinity of the voice assistant. For example, the keyword may be included in media content (e.g., a song, a TV program, a radio program, broadcast content, etc.) being played by the speaker. Accordingly, if the voice assistant detects the keyword output by the speaker, the voice assistant may be inadvertently triggered. Inadvertent triggering has many negative consequences. Performance of undesired commands may range from inconvenient (e.g., music being turned on when a user does not wish to hear it), to costly (e.g., wrong products or media being purchased), to catastrophic (e.g., a door being unlocked during an emergency). Inadvertent triggering of the voice assistant may also cause user frustration because it may interrupt the user, because it may cause the user to need to perform additional actions to de-trigger the voice assistant, or because it may result in the voice assistant performing unintentional and erratic functions. Moreover, inadvertent triggering will consume system resources (e.g., processor cycles, memory, power, etc.).

To solve these problems, systems and methods are provided herein for avoiding inadvertently trigging a voice assistant with audio played through a speaker due to audio being played by the speaker. To accomplish this, the system may rely on known recording standards for recording audio. For example, current standards typically require audio recording to be sampled at a finite sampling frequency of 44,100 Hertz (Hz) or 48,000 Hz. Since the expected sampling frequency of a previous recording is known, an audio signal may be captured by sampling a microphone of the voice assistant at a sampling frequency that is higher than an expected finite sampling frequency of the previously recorded audio played through the speaker to generate a voice data sample. A quality metric of the generated voice data sample may be calculated by determining whether the generated voice data sample comprises artifacts resulting from previous compression or approximation by the expected finite sampling frequency. Based on the calculated quality metric, it may be determined whether the captured audio signal is the previously recorded audio played through the speaker. Responsive to the determination that the captured audio signal is the previously recorded audio played through the speaker, the voice assistant may not be activated.

In some embodiments, capturing the audio signal by sampling the microphone of the voice assistant at the sampling frequency that is higher than the expected finite sampling frequency is performed in response to determining that an audio signal captured by sampling the microphone of the voice assistant at a sampling frequency that is lower than the expected finite sampling frequency includes a keyword for activating the voice assistant.

In some embodiments, the sampling frequency may be at least double the expected finite sampling frequency. In some embodiments, the sampling frequency may be greater than 96 kHz. In some embodiments, the expected finite sampling frequency may be 44.1 kHz or 48 kHz.

In some embodiments, the captured audio signal may include a keyword for activating the voice assistant. In some embodiments, calculating the quality metric may include determining whether a slope of the generated voice data sample in the time domain crosses zero more than a predetermined number of times in a predetermined time period. In other embodiments, calculating the quality metric may include converting the generated voice data sample from the time domain to the frequency domain using a Fast Fourier Transform and determining a number of high-frequency signals in the converted voice data sample. In yet other embodiments, calculating the quality metric may include determining a number of the artifacts resulting from previous compression or approximation by the expected finite sampling frequency in a period of the generated voice data sample and selecting, from a table having a plurality of quality metrics respectively corresponding to different numbers of artifacts in the period, the quality metric corresponding to the determined number of artifacts in the period.

In some embodiments, determining whether the captured audio signal is the previously recorded audio played through the speaker may include comparing the calculated quality metric to a threshold value. In some embodiments, responsive to the determination that the captured audio signal is not the previously recorded audio played through the speaker, the voice assistant may be activated.

It should be noted that the determination that the captured audio signal is the previously recorded audio played through the speaker can be used to improve voice recognition in other ways. For example, it may be used to improve a biometric security system that relies on voice recognition, by preventing a recording of the verified voice being used to bypass the biometric security system.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Systems and methods are disclosed herein for avoiding inadvertently trigging a voice assistant with audio played through a speaker. For example, while conventional systems may trigger the voice assistant merely based on the presence of a keyword or wake word (e.g., "Alexa") for activating the voice assistant, the systems and methods described herein prevent inadvertently activating the voice assistant by differentiating between a user speaking the keyword directly to activate the voice assistant and a speaker in the vicinity of the voice assistant playing the keyword. To do this, the voice assistant may sample audio at a high frequency (e.g., at a frequency that is higher than an expected finite sampling frequency of previously recorded audio played through the speaker), and, if the sampled audio includes the keyword to trigger the voice assistant, the voice assistant may analyze the sampled keyword to determine if the keyword was played through the speaker. For example, the voice assistant may determine if the sampled keyword includes artifacts resulting from previous compression or approximation by the expected finite sampling frequency (e.g., artifacts generated by previous recording of the audio). If the voice assistant determines that the keyword was played through the speaker, the voice assistant may ignore the keyword and refrain from activating. Otherwise, if the voice assistant determines that the audio was not played through a speaker (e.g., it was spoken by a user in the vicinity of the voice assistant), the voice assistant may activate to perform a function associated with a voice command following the keyword.

In signal processing, sound (i.e., a continuous-time signal) is converted to digital audio (a discrete-time signal) by the process of sampling. The Nyquist-Shannon theorem states that in order to accurately reproduce a signal, the signal must be sampled at a sampling frequency that is greater than twice the maximum frequency of the signal. If a lower sampling frequency is used, the signal being sampled may not be accurately reproduced and may result in audible artifacts known as "aliasing" being included in the reproduced signal.

Although there is considerable variation from person to person, the human range of hearing is generally considered to be 20 Hz to 20,000 Hz (i.e., 20 kHz). Accordingly, in order to accurately reproduce audio for media content, audio is usually sampled at a frequency that is greater than twice the upper range of human hearing. For example, audio for media content is usually sampled at either 44.1 kHz or 48 kHz.

Figure 1:
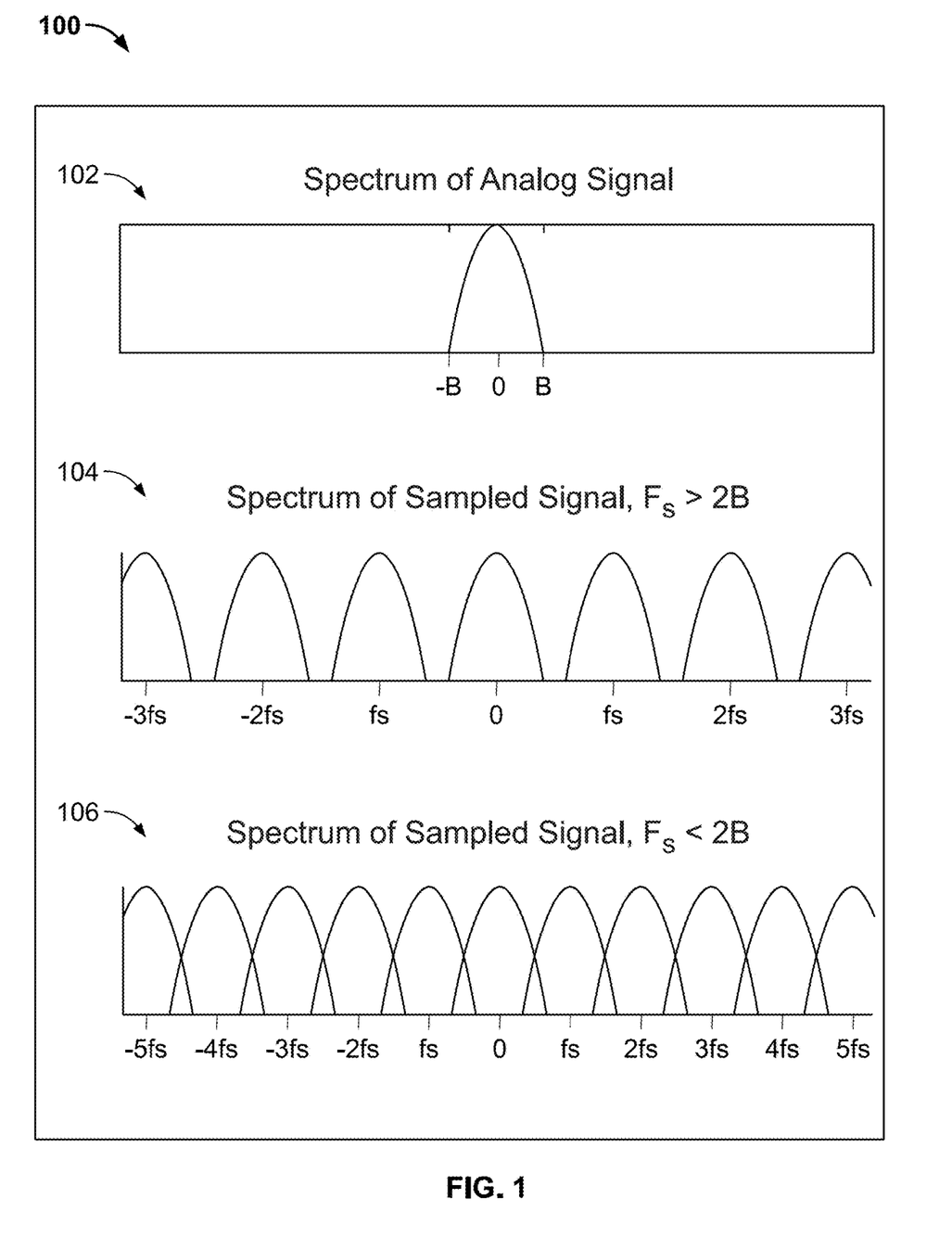
FIG. 1 shows an illustrative diagram of sampling an audio signal, in accordance with some embodiments of the present disclosure.

FIG. 1 shows an illustrative diagram 100 of sampling an audio signal (in the frequency domain), in accordance with some embodiments of the present disclosure. As shown, in 102, the spectrum of an analog signal to be sampled may be from −B to B, where B is the maximum frequency of the analog signal. According to the Nyquist-Shannon theorem, if the analog signal is sampled at a sampling frequency (i.e., $F_s$) that is greater than twice the maximum frequency of the signal (i.e., 2B), the signal may be accurately reproduced, as shown in 104. As also shown in 104, aliases of the sampled signal may appear periodically in the frequency domain with a frequency shift of $n*F_s$.

In contrast, as shown in 106, if the analog signal is sampled at a sampling frequency that is less than (or equal to) twice the maximum frequency of the signal (i.e., B), the signal cannot be accurately reproduced, and aliasing within the spectrum of the audio signal may occur. Put another way, if the maximum frequency of the signal exceeds the "Nyquist frequency" (i.e., half the sampling frequency), aliasing may occur within the spectrum of the audio signal (i.e., within the Nyquist frequency).

Oftentimes, to ensure that audible aliasing does not occur, audio is pre-processed by an anti-aliasing filter before sampling the audio to limit the maximum frequency of the pre-processed signal to be less than the Nyquist frequency. However, because anti-aliasing filters are not ideal, certain high-frequency portions of the audio that exceed the Nyquist frequency may be only substantially attenuated (i.e., not completely removed before the audio is sampled). Accordingly, when the sampled audio is played through a speaker, a certain amount of high-frequency "noise" due to aliasing may also be reproduced. Although such high-frequency noise is not usually detectable by a human ear, it may be detected by a computer when the reproduced audio is sampled at a very high frequency (e.g., at least twice the original sample rate of the previously recorded audio), as described in greater detail below.

Figure 2:
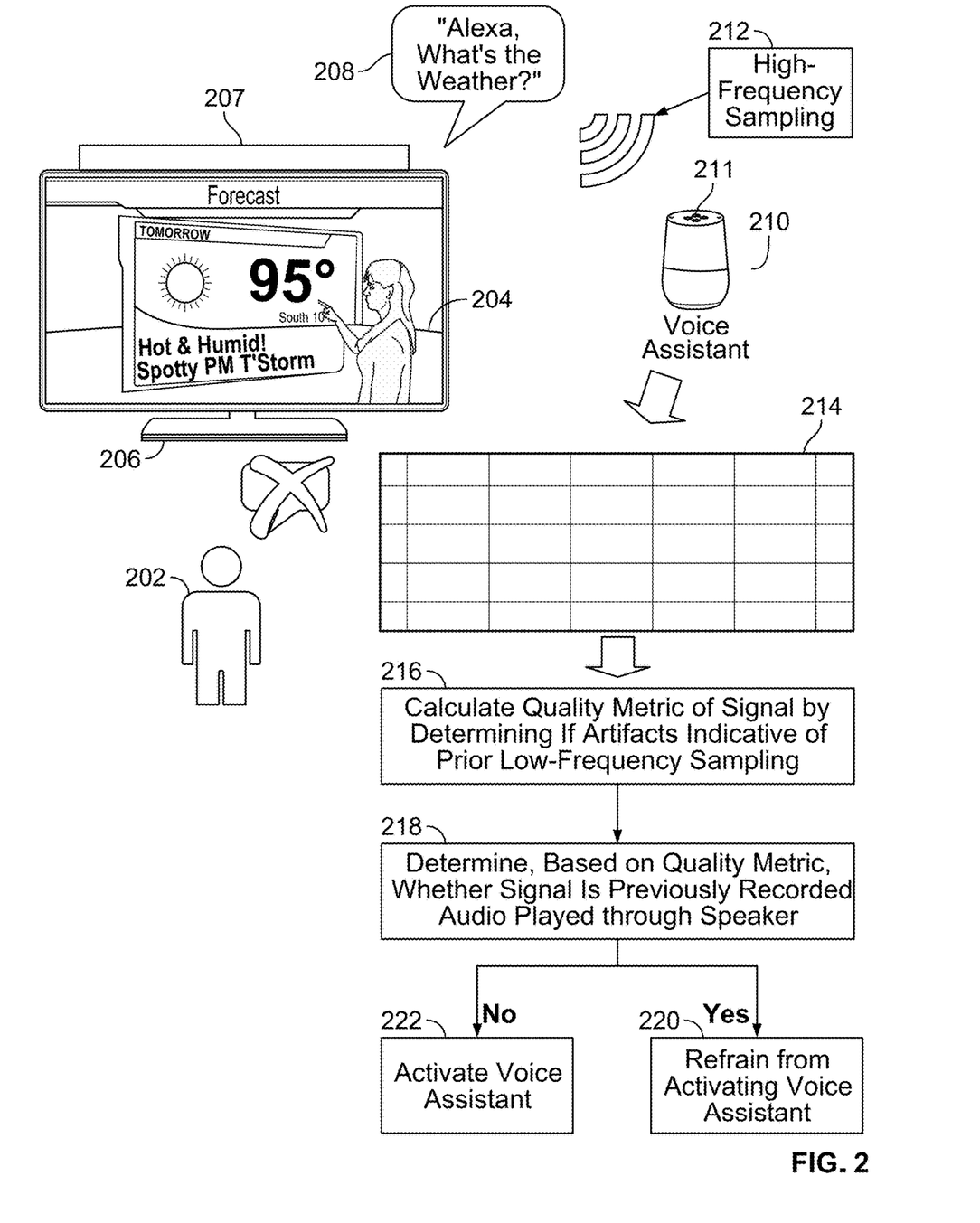
FIG. 2 shows an illustrative process for avoiding inadvertently triggering a voice assistant with previously recorded audio played through a speaker of another electronic device, in accordance with some embodiments of the present disclosure.

FIG. 2 shows an illustrative process for avoiding inadvertently triggering a voice assistant 210 with previously recorded audio played through a speaker 207 of another electronic device (e.g., a TV 206), in accordance with some embodiments of the present disclosure. As described herein, previously recorded audio may refer to any audio that is captured (e.g., through sampling), regardless of whether the captured audio is played immediately through the speaker 207 (and not permanently stored) or stored in a storage before being played through the speaker 207. For example, the audio may have been previously sampled and permanently stored in non-transitory memory at a TV studio before the recorded audio is played by the speaker 207 of the TV 206 after being broadcast. In another example, the TV 206 may be showing a live broadcast where recorded audio is stored in transitory memory only while being broadcast to the TV 206. Additionally, audio played through the speaker 207 in the vicinity of the voice assistant 210 may refer to any audio that is played by a speaker and detected by the voice assistant 210. As shown, a user 202 may be watching, for example, a news program 204 on a TV 206. The news program 204 may include a weather segment hosted by a forecaster named "Alexa." Thus, to introduce the weather segment, the host of the news program 204 may say "Alexa, what's the weather?" 208. The audio 208 may be played through the speaker 207 of the TV 206 and captured by a microphone 211 of the voice assistant 210 in the vicinity of the speaker 207 of the TV 206. The keyword for activating the voice assistant 210 may also be "Alexa."

The voice assistant 210 may implement "always on" listening to detect a keyword for activating the voice assistant 210. During the "always on" listening, the voice assistant 210 may use high-frequency sampling 212 to capture audio. That is, the voice assistant 210 may sample the microphone 211 of the voice assistant 210 at a sampling frequency that is higher than an expected (finite) sampling frequency used to capture audio played through a speaker (e.g., the speaker 207 of the TV 206). In some embodiments, the sampling frequency is greater than at least twice the expected sampling frequency used to capture the audio.

As described above, most audio for multimedia content is sampled at either 44.1 kHz or 48 kHz. Other audio content (e.g., certain phone conversations) may be sampled as low as 8 kHz. Also, certain voice assistants may sample human speech at 16 kHz. Thus, in some embodiments, the high-frequency sampling 212 used by the voice assistant 210 may be greater than twice the highest expected sampling frequency (e.g., 48 kHz) used to capture audio played through the speaker 207. That is, the high-frequency sampling 212 may use a sampling frequency greater than 96 kHz. For example, as described in greater detail with reference to FIG. 3, during the "always on" listening, the voice assistant 210 may sample the microphone 211 at 96.1 kHz to generate the waveform 214. However, this is only one example, and the high-frequency sampling 212 used by the voice assistant 210 may be any frequency greater than 96 kHz (e.g., 100 kHz, 176.4 kHz, 192 kHz, 352.8 kHz, etc.) or any frequency greater than two times higher than an expected (finite) sampling frequency used to capture audio played through the speaker 207. For example, the highest expected sampling frequency may be higher than 48 kHz.

As shown, during the "always on" listening, the voice assistant 210 generates (captures) the high-frequency sampled waveform 214 by sampling the microphone 211 with the high-frequency sampling 212 while the audio 208 is played through the speaker 207 of the TV 206. Although only the first part of the audio 208 (i.e., corresponding to the keyword "Alexa") is shown in the waveform 214, the voice assistant 210 may capture the entire audio 208 using the high-frequency sampling 212. In some embodiments, in order to reduce the amount of data required to be processed, the voice assistant 210 may use the high-frequency sampling 212 only until the keyword (e.g., "Alexa") to activate the voice assistant 210 is detected. In some embodiments, the voice assistant 210 may use the high-frequency sampling 212 until the voice assistant 210 determines that the keyword is spoken by a user (i.e., not played through a speaker), before switching to lower-frequency sampling for the remainder of the conversation with the user. In some embodiments, the voice assistant 210 may always use the high-frequency sampling 212. In some embodiments, the voice assistant 210 may use low-frequency sampling until the voice assistant 210 detects the keyword, before switching to the high-frequency sampling 212 to analyze the audio after the keyword to determine if the audio after the keyword is played through a speaker. However, these are only examples, and the voice assistant 210 may use the high-frequency sampling 212 on any portion of the audio captured by the microphone 211 of the voice assistant 210.

Figure 3:
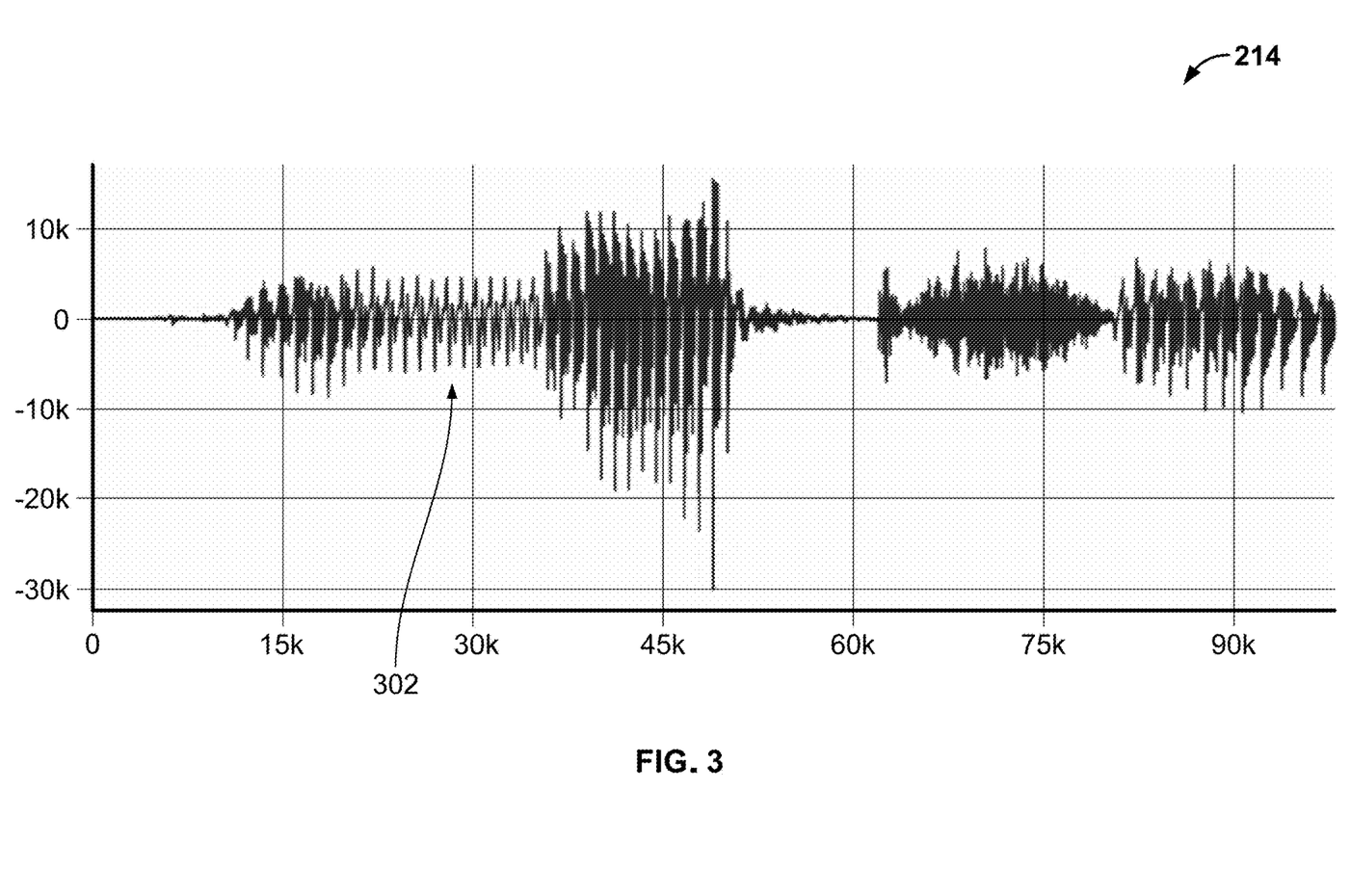
FIG. 3 shows a detailed view of the high-frequency sampled waveform of FIG. 2, in accordance with some embodiments of the present disclosure.

FIG. 3 shows a detailed view of the high-frequency sampled waveform 214 of FIG. 2, in accordance with some embodiments of the present disclosure. In some embodiments, as detailed above, the microphone 211 of the voice assistant 210 may be sampled at 96.1 kHz. Thus, the illustrated portion of the high-frequency sampled waveform 214, which includes over 90,000 individual samples of audio corresponding to the word "Alexa," is around 1 second long. As shown, the high-frequency sampled waveform 214 is in the time domain. The voice assistant 210 may analyze the high-frequency sampled waveform 214 to determine if the high-frequency sampled waveform 214 corresponds to the keyword (e.g., "Alexa"). In response to determining that the high-frequency sampled waveform 214 does correspond to the keyword, the voice assistant 210 may determine if the high-frequency sampled waveform 214 corresponds to audio played through a speaker or audio spoken directly by a user in the vicinity of the voice assistant 210.

Returning to FIG. 2, at 216, the voice assistant 210 may calculate a quality metric of the high-frequency sampled waveform 214 by determining whether the high-frequency sampled waveform 214 includes artifacts resulting from previous compression or approximation by an expected finite sampling frequency. To do this, in some embodiments, the voice assistant 210 may analyze a portion of the high-frequency sampled waveform 214. For example, the voice assistant 210 may analyze the portion 302 of the high-frequency sampled waveform 214 shown in FIG. 2. In some embodiments, the voice assistant 210 may analyze multiple portions of the high-frequency sampled waveform 214 or the entire high-frequency sampled waveform 214.

Figure 4A:
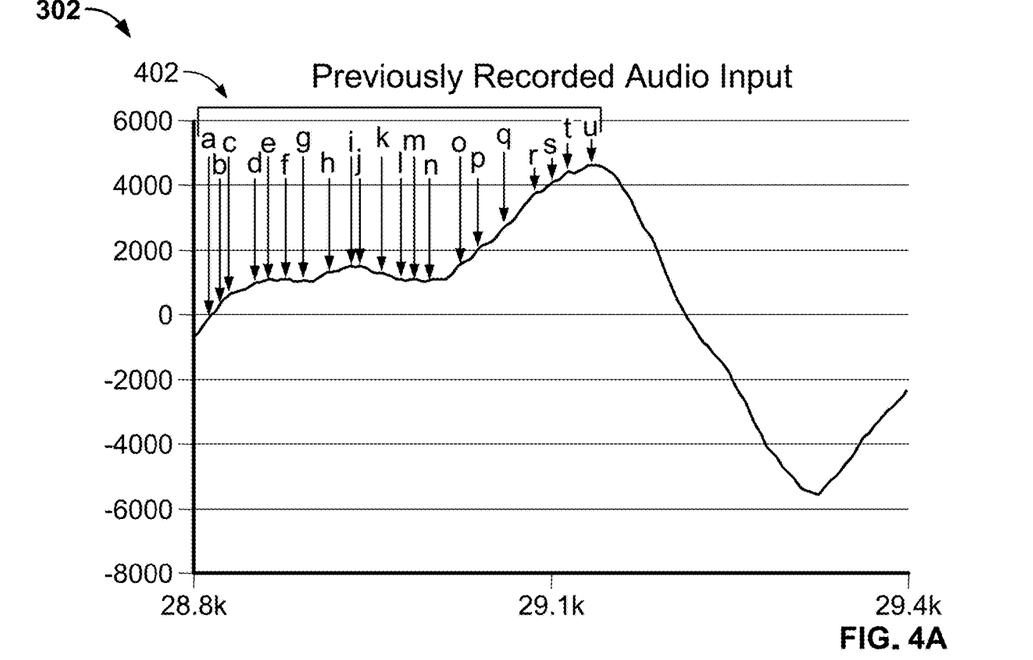
FIG. 4A shows a detailed view of a portion of the high-frequency sampled waveform shown in FIG. 2, when the sampled audio is played through a speaker, in accordance with some embodiments of the present disclosure.

FIG. 4A shows a detailed view of the portion 302 of the high-frequency sampled waveform 214 shown in FIG. 2, when the sampled audio is played through a speaker, in accordance with some embodiments of the present disclosure. As shown, the portion 302 includes the samples from between (and including) sample 28,800 and sample 29,400 of the high-frequency sampled waveform 214. However, this is only one example, and the portion 302 may include any number of the samples of the high-frequency sampled waveform 214. The voice assistant 210 may analyze the portion 302 to determine if there are any artifacts resulting from previous compression or approximation by an expected finite sampling frequency. That is, the voice assistant 210 may analyze the portion 302 to determine if there are any artifacts indicating that the audio is digital audio played through a speaker. For example, a portion 402 between (and including) sample 28,800 to sample 29,200 (of the portion 302) shows several artifacts (e.g., 402a-402u) indicating that the audio is digital audio played through a speaker. As shown, in the time domain, the artifacts 402a-402u may appear as ripples in an otherwise smooth waveform.

The voice assistant 210 may detect the artifacts 402a-402u using a variety of methods. In some embodiments, the voice assistant 210 may apply a discrete differential function to the portion 302 (or portion 402 within the portion 302) and examine how many times the slope of the portion 302 crosses zero. If a discrete differential function is used, it may be advantageous to select certain portions of the high-frequency sampled waveform where the amplitude of the samples does not change too quickly (e.g., the portion 402). In some embodiments, the voice assistant 210 may compare the amplitudes of successive samples to detect the artifacts 402a-402u. For example, the voice assistant 210 may determine the amplitudes increase and then decrease (or visa-versa) within a certain number of samples to identify ripples in an otherwise smooth waveform.

In some embodiments, the voice assistant 210 may first convert the high-frequency sampled waveform 214 (or the portion 402) from the time domain to the frequency domain (e.g., applying techniques such as a Fast Fourier Transform). The voice assistant 210 may then analyze the transformed waveform to determine if any high-frequency components (e.g., noise components) correspond to artifacts (e.g., the artifacts 402a-402u) indicating that the audio is digital audio played through a speaker. For example, the voice assistant 210 may analyze the transformed waveform above a certain frequency (e.g., 20 kHz) where artifacts resulting from previous compression or approximation by an expected finite sampling frequency are expected to exist.

The voice assistant 210 may calculate the quality metric of the high-frequency sampled waveform 214 based on the detected artifacts 402a-402u. The quality metric may indicate the likelihood that the high-frequency sampled waveform 214 corresponds to audio played through a speaker (i.e., and not spoken directly by a user in the vicinity of the voice assistant 210). In some embodiments, the quality metric may be assigned to a value on a scale (e.g., 1 to 10) with the lowest value (e.g., 1) indicating that the high-frequency sampled waveform 214 corresponds to audio spoken directly by a user in the vicinity of the voice assistant 210 and the highest value (e.g., 10) indicating that the high-frequency sampled waveform 214 corresponds to audio played through a speaker. For example, the voice assistant 210 may determine the number of the detected artifacts 402a-402u (e.g., 21) in a certain period (e.g., 400 samples at a sample rate of 96.1 kHz). The voice assistant 210 may access a table of a plurality of quality metrics, each corresponding to a different number of artifacts/period, and select a quality metric corresponding to the detected number of artifacts in a certain period. For example, the voice assistant 210 may access Table 1 (shown below).

TABLE 1

| Quality Metric | Number of Artifacts (per 400 Samples (96.1 kHz)) |
| --- | --- |
| 1 | 0 |
| 2 | 3 |
| 3 | 6 |
| 4 | 9 |
| 5 | 12 |
| 6 | 15 |
| 7 | 18 |
| 8 | 21 |
| 9 | 24 |
| 10 | 27+ |

For convenience, Table 1 shows the correspondence between a plurality of quality metrics and the different number of artifacts per 400 samples (at 96.1 kHz). However, in order to allow Table 1 to be used for different sampling frequencies and sample sizes, the "Number of Artifacts" in Table 1 may be expressed as a rate of artifacts per second. For example, 21 artifacts in a period of 400 samples at a sample rate of 96.1 kHz corresponds to a rate of 5045 artifacts per second. If the number of artifacts in a sample is between the numbers provided in Table 1, linear interpolation may be used to calculate a quality metric.

Referring to Table 1, the voice assistant 210 may determine that 21 artifacts in the period of 400 samples (at a sample rate of 96.1 kHz) corresponds to a quality metric of 8, which signifies that it is very likely that the high-frequency sampled waveform 214 corresponds to audio played through a speaker. However, this is only one example, and any quality metric indicating the likelihood that the high-frequency sampled waveform 214 corresponds to audio played through a speaker may be used.

Figure 4B:
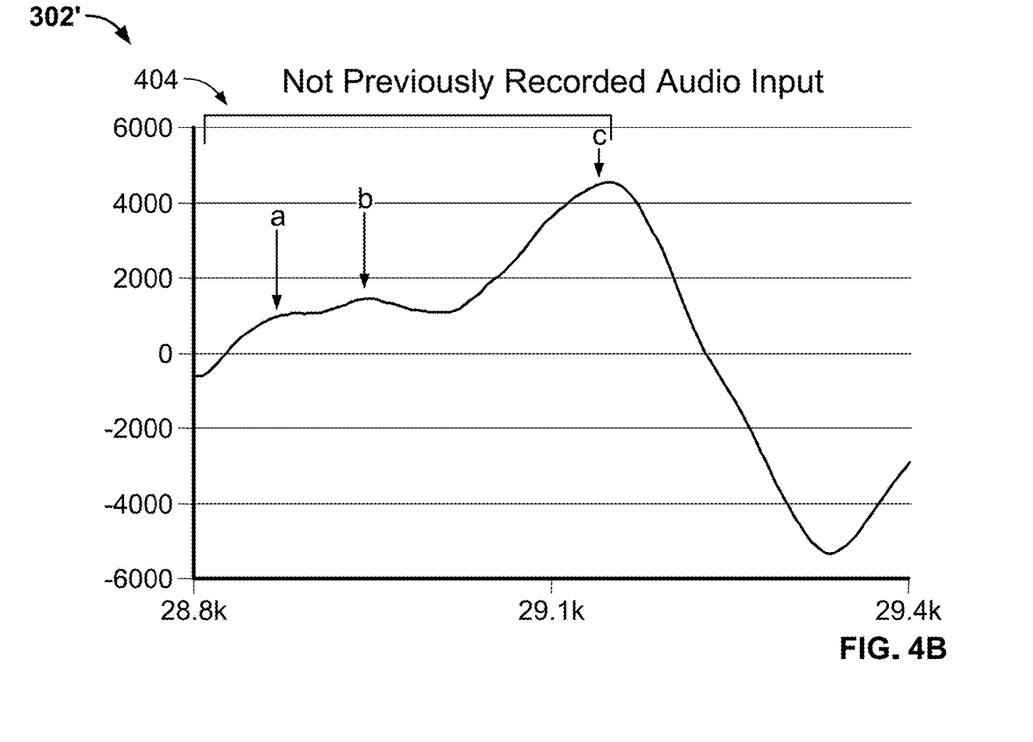
FIG. 4B shows a detailed view of a portion of the high-frequency sampled waveform shown in FIG. 2, when the sampled audio is spoken directly by a user in the vicinity of the voice assistant, in accordance with some embodiments of the present disclosure.

FIG. 4B shows a detailed view of the portion 302' of the high-frequency sampled waveform 214 shown in FIG. 2, when the sampled audio is spoken directly by a user (e.g., user 202) in the vicinity of the voice assistant 210, in accordance with some embodiments of the present disclosure. As shown, the portion 302' also includes the samples between (and including) sample 28,800 to sample 29,400 of the high-frequency sampled waveform 214. As similarly described above with reference to FIG. 4A, the voice assistant 210 may analyze the portion 302' to determine if there are any artifacts resulting from previous compression or approximation by an expected finite sampling frequency. That is, the voice assistant 210 may analyze the portion 302' to determine if there are any artifacts indicating that the audio is digital audio played through a speaker. For example, a portion 404 between (and including) sample 28,800 to sample 29,200 (of the portion 302') shows only three possible artifacts (e.g., 404a-404c). However, in contrast to FIG. 4A, the possible artifacts 404a-404c do not appear as ripples in an otherwise smooth waveform. Instead, the possible artifacts 404a-404c have a smoother appearance than the ripples 402a-402u illustrated in FIG. 4A. However, depending on how artifacts are detected (e.g., by applying a discrete differential function), the possible artifacts 404a-404c may be incorrectly identified as artifacts.

As similarly described above with reference to FIG. 4A, the voice assistant 210 may calculate the quality metrics of the high-frequency sampled waveform 214 based on the detected artifacts 404a-404c. For example, using Table 1, the voice assistant 210 may determine that 3 artifacts in the period of 400 samples (at a sample rate of 96.1 kHz) corresponds to a quality metric of 2, which signifies that it is very likely that the high-frequency sampled waveform 214 corresponds to audio spoken directly by a user (e.g., user 202) in the vicinity of the voice assistant 210.

Returning to FIG. 2, at 218, the voice assistant 210 may determine, based on the determined quality metric, whether the high-frequency sampled waveform 214 corresponds to previously recorded audio played through a speaker or audio spoken directly by a user in the vicinity of the voice assistant 210. For example, the voice assistant 210 may compare the determined quality metric to a threshold value. The threshold value may, for example, correspond to the quality metric scale discussed above with reference to FIGS. 4A and 4B. If the determined quality metric is greater than the threshold value, the voice assistant 210 may determine that the high-frequency sampled waveform 214 corresponds to previously recorded audio played through a speaker. In some embodiments, the threshold value may be set in advance (e.g., the threshold value may be set to 5). In some embodiments, the threshold value may be set by a user or automatically adjusted based on feedback from a user. A lower threshold value may increase the likelihood that the voice assistant 210 determines that the high-frequency sampled waveform 214 corresponds to previously recorded audio played through a speaker. Similarly, a higher threshold value may decrease the likelihood that the voice assistant determines that the high-frequency sampled waveform 214 corresponds to previously recorded audio played through a speaker.

With reference to FIG. 4A, the voice assistant 210 may compare the quality metric of the portion 302 (i.e., 8) with the threshold value (e.g., 5). Based on the comparison, the voice assistant 210 may determine that the high-frequency sampled waveform 214 corresponds to previously recorded audio played through a speaker. Thus, at 220, the voice assistant 210 may refrain from activating.

With reference to FIG. 4B, the voice assistant 210 may compare the quality metric of the portion 302' (i.e., 2) with the threshold value (e.g., 5). Based on the comparison, the voice assistant 210 may determine that the high-frequency sampled waveform 214 does not correspond to previously recorded audio played through a speaker. That is, the voice assistant 210 may determine that the high-frequency sampled waveform 214 is spoken directly by a user (e.g., user 202) in the vicinity of the voice assistant 210. Thus, at 222, the voice assistant 210 may activate.

Figure 5:
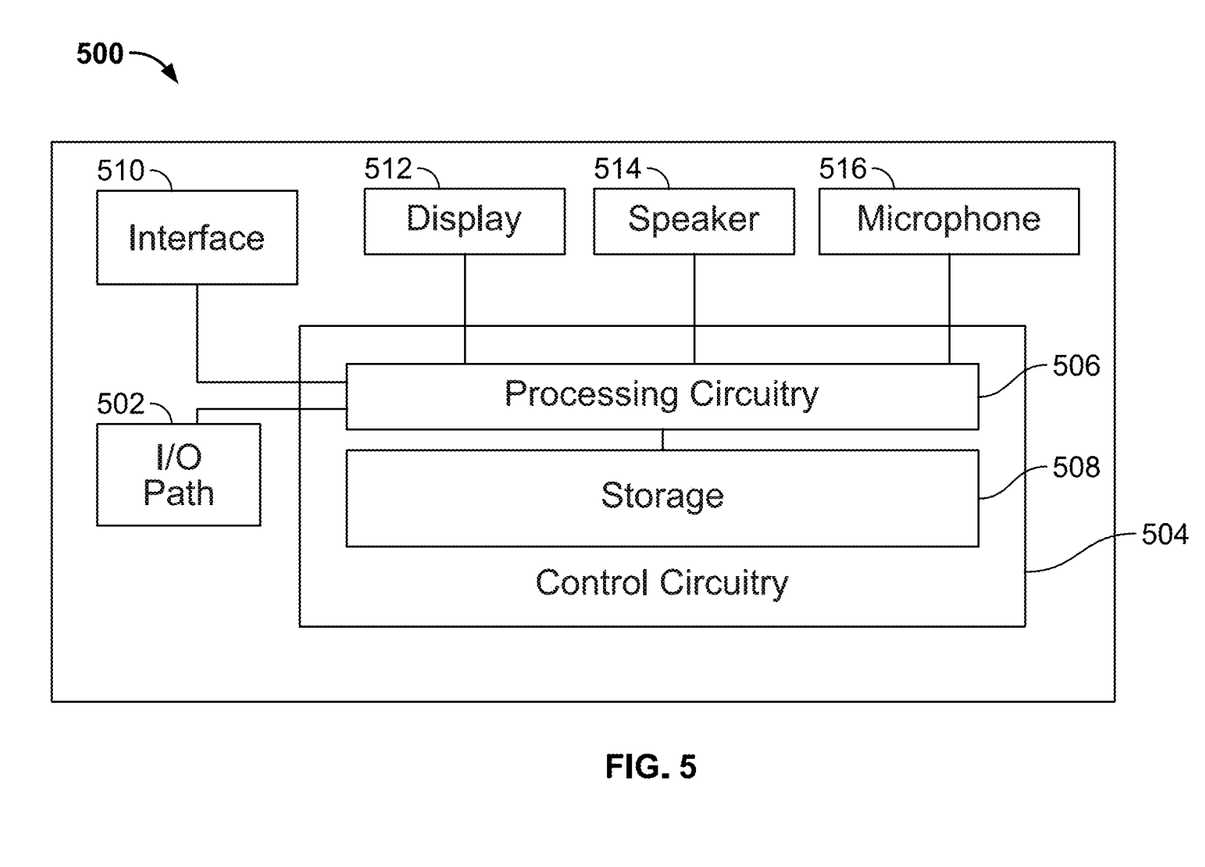
FIGS. 5-6 describe exemplary devices, systems, servers, and related hardware for avoiding inadvertently triggering a voice assistant with audio played through a speaker, in accordance with some embodiments of the present disclosure.
Figure 6:
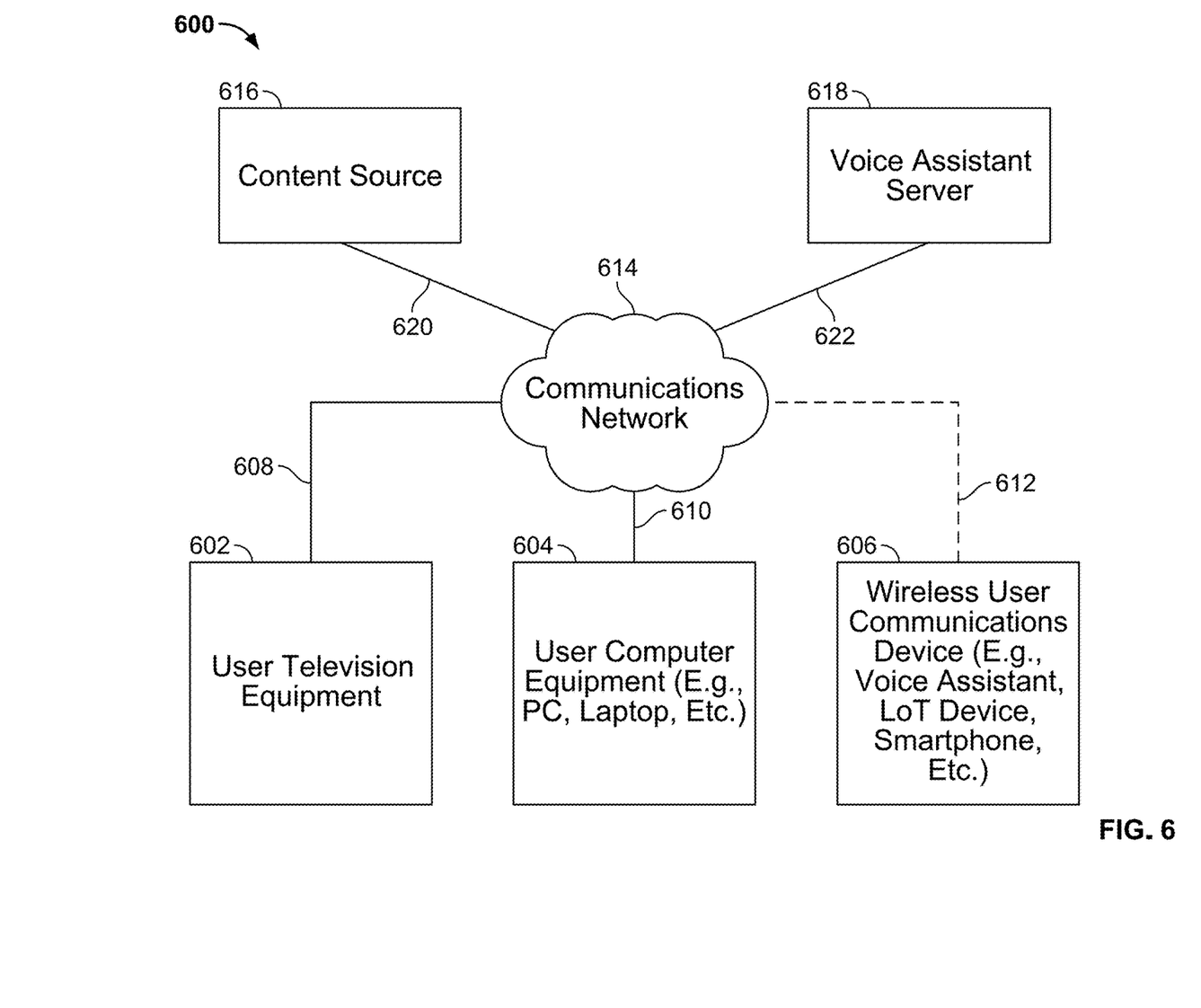

FIGS. 5-6 describe exemplary devices, systems, servers, and related hardware for avoiding inadvertently triggering a voice assistant with audio played through a speaker, in accordance with some embodiments of the present disclosure. FIG. 5 shows a generalized embodiment of a user equipment device 500, in accordance with one embodiment. The user equipment device 500 may be a more detailed version of the voice assistant 210 or the other, more specific implementations of the devices discussed below in connection with FIG. 6.

The user equipment device 500 may receive content and data via input/output (I/O) path 502. The I/O path 502 may provide audio content (e.g., broadcast programming, on-demand programming, Internet content, content available over a local area network (LAN) or wide area network (WAN), and/or other content) and data to control circuitry 504, which includes processing circuitry 506 and a storage 508. The control circuitry 504 may be used to send and receive commands, requests, and other suitable data using the I/O path 502. The I/O path 502 may connect the control circuitry 504 (and specifically the processing circuitry 506) to one or more communications paths (described below). The I/O path 502 may include circuitry (e.g., input circuitry) including, for example, an analog to digital converter to receive audio signals through the microphone 516, a wired network port, a wireless network port, or any other circuitry suitably configured to perform I/O functions. I/O functions may be provided by one or more of these communications paths, but are shown as a single path in FIG. 5 to avoid overcomplicating the drawing.

The control circuitry 504 may be based on any suitable processing circuitry such as the processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 504 executes instructions for a voice assistant application stored in memory (i.e., the storage 508). Specifically, the control circuitry 504 may be instructed by the voice assistant application to perform the functions discussed above and below. For example, the voice assistant application may provide instructions to the control circuitry 504 to process and interpret voice commands received from a microphone 516, to determine if the voice commands were played by a speaker, and to respond voice commands determined not to be played by the speaker such as by, for example, transmitting the commands to a central server or retrieving information from the Internet, both of these being sent over the I/O path 502. In some implementations, any action performed by the control circuitry 504 may be based on instructions received from the voice assistant application.

In client-server based embodiments, the control circuitry 504 may include communications circuitry suitable for communicating with a voice assistant server or other networks or servers. The instructions for carrying out the above-mentioned functionality may be stored on the voice assistant server. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 508 that is part of the control circuitry 504. As referred to herein, the phrase "electronic storage device" or "storage device" should be understood to mean any device for storing electronic data, computer software, or firmware, such as random-access memory, read-only memory, hard drives, optical drives, digital video recorders (DVRs, sometimes called personal video recorders, or PVRs), solid-state devices, quantum storage devices, gaming consoles, gaming media, or any other suitable fixed or removable storage devices, and/or any combination of the same. The storage 508 may be used to store various types of content described herein. Nonvolatile memory may also be used (e.g., to launch a boot-up routine and other instructions). Cloud-based storage, described in relation to FIG. 6, may be used to supplement the storage 508 or instead of the storage 508.

The control circuitry 504 may include audio-generating circuitry and tuning circuitry, such as one or more analog tuners, audio-generation circuitry, filters or any other suitable tuning or audio circuits or combinations of such circuits. The control circuitry 504 may also include scaler circuitry for upconverting and downconverting content into the preferred output format of the user equipment device 500. The control circuitry 504 may also include digital-to-analog converter circuitry and analog-to-digital converter circuitry for converting between digital and analog signals. The tuning and encoding circuitry may be used by the user equipment device 500 to receive and to display, to play, or to record content. The circuitry described herein, including, for example, the tuning, audio-generating, encoding, decoding, encrypting, decrypting, scaler, and analog/digital circuitry, may be implemented using software running on one or more general purpose or specialized processors. If the storage 508 is provided as a separate device from the user equipment device 500, the tuning and encoding circuitry (including multiple tuners) may be associated with the storage 508.

The microphone 516 may be any microphone (or microphones) capable of being sampled using the high-frequency sampling 212 to detect audio (e.g., human speech and audio played through a speaker). The microphone 516 is connected to the processing circuitry 506 to transmit detected audio (or speech) for processing.

The user equipment device 500 may optionally include an interface 510. The interface 510 may be any suitable user interface, such as a remote control, mouse, trackball, keypad, keyboard, touchscreen, touchpad, stylus input, joystick, or other user input interfaces. A display 512 may be provided as a stand-alone device or integrated with other elements of the user equipment device 500. For example, the display 512 may be a touchscreen or touch-sensitive display. In such circumstances, the interface 510 may be integrated with or combined with the microphone 516. When the interface 510 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, the interface 510 may be HDTV-capable. In some embodiments, the display 512 may be a 3D display.

The interface 510 may, for example, display a menu for adjusting the threshold value used to determine whether the high-frequency sampled waveform 214 corresponds to previously recorded audio played through a speaker.

The speaker (or speakers) 514 may be provided as integrated with other elements of user equipment device 500 or may be a stand-alone unit. The speaker 514 is connected to the processing circuitry 506 to emit verbal responses to voice queries by a user (e.g., user 202 of FIG. 2). More specifically, voice queries from the user (e.g., user 202 of FIG. 2) are detected by the microphone 516, and if they are determined not to be played through a speaker, are transmitted to the processing circuitry 506, where they are translated into commands according to voice assistant software stored in the storage 506. The software formulates a query corresponding to the commands and transmits this query to, for example, a search engine or other Internet resource over the I/O path 502. Any resulting answer is received over the same path 502, converted to an audio signal by the processing circuitry 506, and emitted by the speaker 514 as an answer to the voice command uttered by the user 202.

The user equipment device 500 of FIG. 5 can be implemented in system 600 of FIG. 6 as user television equipment 602, user computer equipment 604, a wireless user communications device 606, or any other type of user equipment suitable for conducting an electronic search and providing results thereof. For example, the user equipment device 500 may be incorporated into the TV 206, i.e., the user television equipment 602. User equipment devices may be part of a network of devices. Various network configurations of devices may be implemented and are discussed in more detail below.

In the system 600, there are typically more than one of each type of user equipment device, but only one of each is shown in FIG. 6 to avoid overcomplicating the drawing. In addition, a user may utilize more than one type of user equipment device and more than one of each type of user equipment device.

The user equipment devices may be coupled to communications network 614. Namely, the user television equipment 602, the user computer equipment 604, and the wireless user communications device 606 are coupled to the communications network 614 via communications paths 608, 610, and 612, respectively. The communications network 614 may be one or more networks including the Internet, a mobile phone network, mobile voice or data network (e.g., a 4G or LTE network), cable network, public switched telephone network, or other types of communications network or combinations of communications networks. The paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. The path 612 is drawn with dotted lines to indicate that in the exemplary embodiment shown in FIG. 6 it is a wireless path, and the paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with the paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via the communications network 614.

The system 600 also includes content source 616, and voice assistant server 618, which can be coupled to any number of databases providing information to the voice assistant 210 in FIG. 2. The content source 616 and the voice assistant server 618 may be coupled to the communications network 614 via communications paths 620 and 622, respectively. Although communications paths are not drawn between the content source 616 and the voice assistant server 618, these devices may communicate directly with each other via communication paths, such as those described above. The content source 616 represents any computer-accessible source of content, such as a storage for audio content, metadata, or, e.g., information about prior voice assistant sessions. The voice assistant server 618 may store and execute various software modules for implementing the voice assistant functionality of a voice assistant (e.g., voice assistant 210 of FIG. 2). In some configurations, these modules may include natural language interface, information retrieval, search, machine learning, and any other modules for implementing functions of a voice assistant. Such modules and functions are known.

Figure 7:
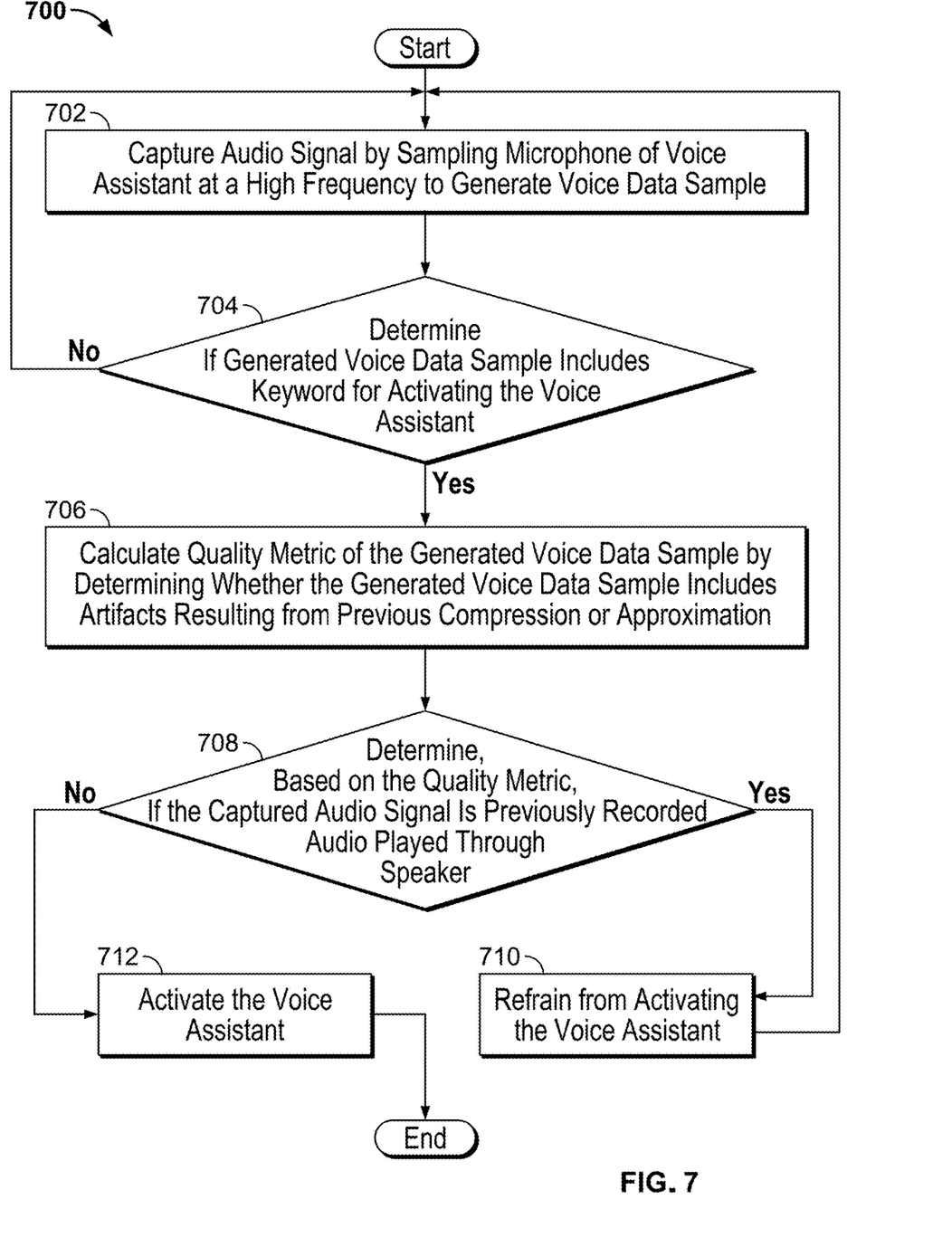
FIG. 7 depicts a flowchart of illustrative steps for avoiding inadvertently triggering a voice assistant with previously recorded audio played through a speaker, in accordance with some embodiments of the present disclosure.

FIG. 7 depicts a flowchart of illustrative steps for avoiding inadvertently triggering a voice assistant with previously recorded audio played through a speaker, in accordance with some embodiments of the present disclosure. For example, a voice assistant application implementing process 700 may be executed by the control circuitry 504 of the user equipment device 500. In some embodiments, instructions for executing process 700 may be encoded onto a non-transitory storage medium (e.g., the storage 508) as a set of instructions to be decoded and executed by processing circuitry (e.g., the processing circuitry 506). Processing circuitry may, in turn, provide instructions to other sub-circuits contained within control circuitry 504, such as the encoding, decoding, encrypting, decrypting, scaling, analog/digital conversion circuitry (e.g., to convert the captured analog signal into a digital signal by sampling), and the like. It should be noted that the process 700, or any step thereof, could be performed on, or provided by, any of the devices shown in FIGS. 1 and 5-6.

Process 700 begins at step 702, when the voice assistant application (e.g., via the control circuitry 504) may capture an audio signal by sampling a microphone (e.g., the microphone 516) at a high frequency to generate a voice data sample. For example, the voice assistant application may use a sampling frequency that is higher than an expected finite sampling frequency of previously recorded audio played through a speaker (e.g., a speaker of the user television equipment 602) in the vicinity of the user equipment device.

At step 704, the voice assistant application (e.g., via the control circuitry 504) may determine if the generated voice data sample includes a keyword (e.g., "Alexa") for activating a voice assistant. For example, the control circuitry 504 may analyze the generated voice data sample corresponding to the audio signal received at the microphone 516 to identify if the generated voice data sample includes the keyword. If the control circuitry 504 determines that the generated voice data sample does not include the keyword ("No" at 704), the process 700 may return to step 702. Otherwise ("Yes" at 704), the process 700 may proceed to step 706.

At step 706, the voice assistant application (e.g., via the control circuitry 504) may calculate a quality metric of the generated voice data sample by determining whether the generated voice data sample includes artifacts resulting from previous compression or approximation. For example, the control circuitry 504 may determine the number and/or spacing of artifacts included in a certain period of the generated voice data sample (e.g., the entire generated voice data sample or a portion of the generated voice data sample). The control circuitry 504 may access a table having a plurality of quality metrics, each corresponding to a different ratio of artifacts/period, and select a quality metric corresponding to the artifacts detected in a certain period.

At step 708, the voice assistant application (e.g., via the control circuitry 504) may determine, based on the calculated quality metric, if the captured audio signal is previously recorded audio played through a speaker (e.g., a speaker of the user television equipment 602) in the vicinity of the user equipment device 500. For example, the control circuitry 504 may compare the calculated quality metric to a threshold value to determine if the captured audio is previously recorded audio played through the speaker or spoken directly by a user (e.g., user 202) in the vicinity of the user equipment device 500. If the control circuitry 504 determines that the captured audio signal is previously recorded audio played through the speaker (e.g., "Yes" at 708), the process 700 may proceed to step 710 and refrain from activating the voice assistant. Otherwise, if the control circuitry 504 determines that the captured audio is not previously recorded audio played through the speaker (e.g., "No" at 708), the process 700 may proceed to step 712 and activate the voice assistant. If the control circuitry 504 refrains from activating the voice assistant at step 710, the process may return to step 702. However, this is only one example, and the process 700 may, e.g., grant or deny access to a biometric security system based on the decision at step 708, or perform (or not perform) any other function based on the determination.

At step 710, the voice assistant application (e.g., via the control circuitry 504) may refrain from activating the voice assistant and return to step 702. At step 712, the voice assistant application (e.g., via the control circuitry 504) may activate the voice assistant.

Figure 8:
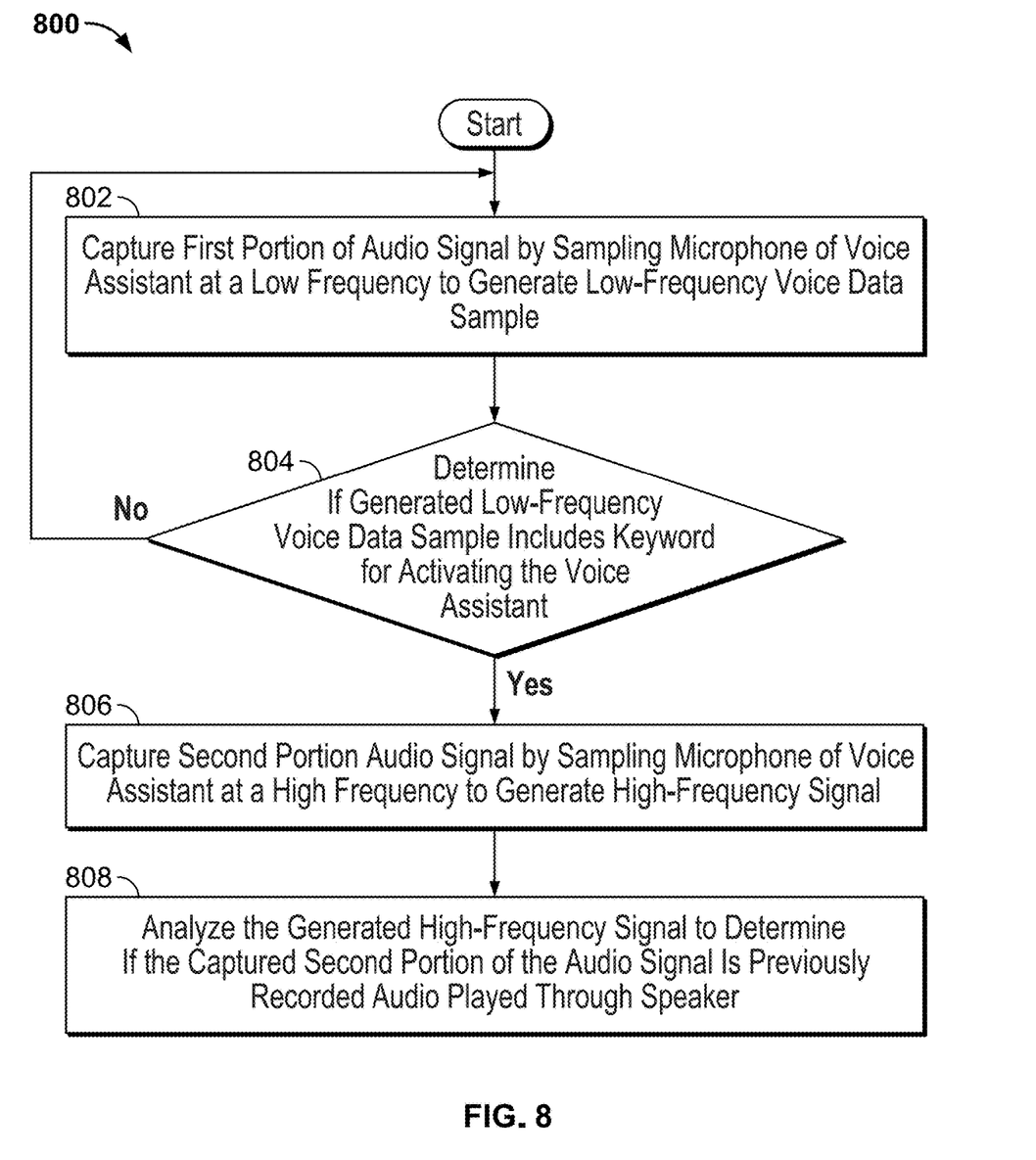
FIG. 8 depicts a flowchart of illustrative steps for avoiding inadvertently triggering a voice assistant with previously recorded audio played through a speaker, in accordance with some embodiments of the present disclosure.

FIG. 8 depicts a flowchart of illustrative steps for avoiding inadvertently triggering a voice assistant with previously recorded audio played through a speaker, in accordance with some embodiments of the present disclosure. For example, a voice assistant application implementing process 800 may be executed by the control circuitry 504 of the user equipment device 500. In some embodiments, instructions for executing process 800 may be encoded onto a non-transitory storage medium (e.g., the storage 508) as a set of instructions to be decoded and executed by processing circuitry (e.g., the processing circuitry 506). Processing circuitry may, in turn, provide instructions to other sub-circuits contained within control circuitry 504, such as the encoding, decoding, encrypting, decrypting, scaling, analog/digital conversion circuitry (e.g., to convert the captured analog signal into a digital signal by sampling), and the like. It should be noted that the process 800, or any step thereof, could be performed on, or provided by, any of the devices shown in FIGS. 1 and 5-6.

Process 800 begins at step 802, when the voice assistant application (e.g., via the control circuitry 504) may capture a first part of an audio signal by sampling a microphone (e.g., the microphone 516) at a low frequency to generate a low-frequency voice data sample. For example, the voice assistant application may use a sampling frequency that is sufficient only for capturing the human voice (e.g., 16 kHz). In some embodiments, the low sampling frequency may be the same as or lower than an expected finite sampling frequency of previously recorded audio played through the speaker (e.g., a speaker of the user television equipment 602) in the vicinity of the user equipment device.

At step 804, the voice assistant application (e.g., via the control circuitry 504) may determine if the generated low-frequency voice data sample includes a keyword (e.g., "Alexa") for activating a voice assistant. For example, the control circuitry 504 may analyze the generated voice data sample corresponding to the first part of the audio signal received at the microphone 516 to identify if the generated voice data sample includes the keyword. If the control circuitry 504 determines that the generated voice data sample does not include the keyword ("No" at 804), the process 800 may return to step 802. Otherwise, ("Yes" at 804), the process 800 may proceed to step 806.

At step 806, the voice assistant application (e.g., via the control circuitry 504) may capture a second part of the audio signal by sampling the microphone 516 at a high frequency to generate a high-frequency voice data sample. For example, when the first part of the audio signal includes the keyword (e.g., "Alexa"), the second part of the audio signal may be the voice command following the keyword (e.g., "what's the weather?"). The voice assistant application may use the high-frequency sampling discussed above in step 702 of FIG. 7.

At step 808, the voice assistant application (e.g., via the control circuitry 504) may analyze the generated high-frequency signal to determine if the captured second portion of the audio signal is previously recorded audio played through a speaker. To do this, the voice assistant application may use the processing discussed above in steps 706 and 708 of FIG. 7. Based on the determination, the voice assistant application may either activate the voice assistant or refrain from activating the voice assistant (and return to the start of the process 800), as discussed above in steps 710 and 712.

It is contemplated that the steps or descriptions FIGS. 7-8 may be used with any other embodiment of this disclosure. In addition, the descriptions described in relation to the algorithms of FIGS. 7-8 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the processes of FIGS. 7-8 may be implemented on a combination of appropriately configured software and hardware, and that any of the devices or equipment discussed in relation to FIGS. 1 and 5-6 could be used to implement one or more portions of the process.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
capturing an audio signal, by a microphone of a voice assistant, to generate a voice data sample;
calculating a quality metric of the generated voice data sample by determining a number of artifacts resulting from previous compression or approximation by an expected finite sampling frequency in a period of the generated voice data sample and selecting, from a data structure having a plurality of quality metrics respectively corresponding to different numbers of artifacts in the period, the quality metric corresponding to the determined number of artifacts in the period;
determining, based on comparing the calculated quality metric to a threshold, whether the captured audio signal is audio played through a speaker;
in response to determining that the captured audio signal is the audio played through the speaker, refraining from activating the voice assistant;
receiving user feedback to the refraining from activating the voice assistant; and
adjusting the threshold based on the feedback.

2. The method of claim 1, wherein the capturing the audio signal comprises sampling the audio signal at a sampling frequency that is higher than the expected finite sampling frequency of the audio played through the speaker to generate a voice data sample.

3. The method of claim 1, wherein the capturing the audio signal by the microphone of the voice assistant is caused by detecting a keyword.

4. The method of claim 1, wherein the determining the number of artifacts in the voice data sample comprises:
converting the voice data sample from the time domain to the frequency domain using a Fast Fourier Transform; and
analyzing the voice data sample for noise components in a high frequency spectrum of the voice data sample in the frequency domain.

5. The method of claim 1, further comprising:
capturing a subsequent audio signal, by the microphone of the voice assistant to generate a new voice data sample, wherein the quality metric of the new generated voice data sample is compared to the adjusted threshold.

6. A system comprising:
input/output circuitry configured to:
capture an audio signal, by a microphone of a voice assistant, to generate a voice data sample;
control circuitry configured to:
calculate a quality metric of the generated voice data sample by determining a number of artifacts resulting from previous compression or approximation by an expected finite sampling frequency in a period of the generated voice data sample and selecting, from a data structure having a plurality of quality metrics respectively corresponding to different numbers of artifacts in the period, the quality metric corresponding to the determined number of artifacts in the period;
determine, based on comparing the calculated quality metric to a threshold, whether the captured audio signal is audio played through a speaker;
in response to determining that the captured audio signal is the audio played through the speaker, refrain from activating the voice assistants;
receive user feedback to the refraining from activating the voice assistant; and
adjust the threshold based on the feedback.

7. The system of claim 6, wherein the input/output circuitry is configured to capture the audio signal by:
sampling the audio signal at a sampling frequency that is higher than the expected finite sampling frequency of the audio played through the speaker to generate a voice data sample.

8. The system of claim 6, wherein the input/output circuitry is configured to capture the audio signal by the microphone of the voice assistant by detecting a keyword.

9. The system of claim 6, wherein the control circuitry is configured to determine the number of artifacts in the voice data sample by:
converting the voice data sample from the time domain to the frequency domain using a Fast Fourier Transform; and
analyzing the voice data sample for noise components in a high frequency spectrum of the voice data sample in the frequency domain.

10. The system of claim 6,
wherein the control circuitry is further configured to:
capture a subsequent audio signal, by the microphone of the voice assistant to generate a new voice data sample, wherein the quality metric of the new generated voice data sample is compared to the adjusted threshold.

11. A non-transitory computer readable medium comprising:
instructions that when executed by input/output circuitry cause the input/output circuitry to:
capture an audio signal, by a microphone of a voice assistant, to generate a voice data sample;
instructions that when executed by control circuitry cause the control circuitry to:
calculate a quality metric of the generated voice data sample by determining a number of artifacts resulting from previous compression or approximation by an expected finite sampling frequency in a period of the generated voice data sample and selecting, from a data structure having a plurality of quality metrics respectively corresponding to different numbers of artifacts in the period, the quality metric corresponding to the determined number of artifacts in the period;
determine, based on comparing the calculated quality metric to a threshold, whether the captured audio signal is audio played through a speaker;
in response to determining that the captured audio signal is the audio played through the speaker, refrain from activating the voice assistants;
receive user feedback to the refraining from activating the voice assistant; and
adjust the threshold based on the feedback.

12. The non-transitory computer readable medium of claim 11, wherein the instructions that cause the input/output circuitry to capture the audio signal cause the input/output circuitry to:
sample the audio signal at a sampling frequency that is higher than the expected finite sampling frequency of audio played through the speaker to generate a voice data sample.

13. The non-transitory computer readable medium of claim 11, further comprising instructions that when executed by the input/output circuitry cause the input/output circuitry to:
capture the audio signal by the microphone of the voice assistant by detecting a keyword.

14. The non-transitory computer readable medium of claim 11, wherein the instructions that cause the control circuitry to determine the number of artifacts in the voice data sample cause the control circuitry to:
convert the voice data sample from the time domain to the frequency domain using a Fast Fourier Transform; and
analyze the voice data sample for noise components in a high frequency spectrum of the voice data sample in the frequency domain.

15. The non-transitory computer readable medium of claim 11,
further comprising instructions that when executed by control circuitry cause the control circuitry to:
capture a subsequent audio signal, by the microphone of the voice assistant to generate a new voice data sample, wherein the quality metric of the new generated voice data sample is compared to the adjusted threshold.

* * * * *

UNITED STATES PATENT AND TRADEMARK OFFICE
CERTIFICATE OF CORRECTION

PATENT NO. : 12,002,466 B2
APPLICATION NO. : 17/984394
DATED : June 4, 2024
INVENTOR(S) : Aher et al.

Page 1 of 1

It is certified that error appears in the above-identified patent and that said Letters Patent is hereby corrected as shown below:

In the Claims

In Claim 6, Column 16, Line 42, delete "assistants" and insert --assistant--.

In Claim 11, Column 17, Line 27, delete "assistants" and insert --assistant--.

Signed and Sealed this
Twenty-second Day of July, 2025

Coke Morgan Stewart
*Acting Director of the United States Patent and Trademark Office*